United States Patent
Niedermann et al.

[11] Patent Number: 6,056,887
[45] Date of Patent: May 2, 2000

[54] PROCESS FOR FABRICATING A FEELER MEMBER FOR A MICROMECHANICAL PROBE, IN PARTICULAR FOR AN ATOMIC FORCE MICROSCOPE

[75] Inventors: Philipp Niedermann; Cynthia Beuret, both of Neuchatel; Sylvain Jeanneret, La Chaux-De-Fonds, all of Switzerland

[73] Assignee: C.S.E.M. - Centre Suisse d'Electronique et de Microtechniques S.A., Neuchatel, Switzerland

[21] Appl. No.: 09/090,791

[22] Filed: Jun. 4, 1998

[30] Foreign Application Priority Data

Jun. 5, 1997 [FR] France ................... 97 06986

[51] Int. Cl.[7] ................. C23F 1/00; C25F 3/00; B44C 1/22
[52] U.S. Cl. ................. 216/2; 216/11; 216/48; 216/63; 216/66; 216/74; 216/79
[58] Field of Search ................ 216/2, 11, 48, 216/66, 79, 63, 74; 438/22, 39, 40, 41, 42, 43, 44, 50, 52, 53, 320, 321

[56] References Cited

U.S. PATENT DOCUMENTS

| | | | |
|---|---|---|---|
| 4,968,585 | 11/1990 | Albrecht et al. | 250/306 |
| 5,051,379 | 9/1991 | Bayer et al. | 437/225 |
| 5,221,415 | 6/1993 | Albrecht et al. | 156/629 |
| 5,367,165 | 11/1994 | Toda et al. | 250/306 |
| 5,540,958 | 7/1996 | Bothra et al. | 427/535 |
| 5,923,637 | 9/1996 | Shimada et al. | 369/126 |

FOREIGN PATENT DOCUMENTS

| | | | |
|---|---|---|---|
| 0766060 | 4/1997 | European Pat. Off. | G01B 7/34 |
| 4126151 | 8/1992 | Germany | H01J 37/38 |
| WO9221135 | 11/1992 | WIPO | H01J 37/26 |
| WO9534000 | 2/1996 | WIPO | G01R 1/073 |

OTHER PUBLICATIONS

"Microfabrication of cantilever styli for the atomic force microscope", T.R. Albrecht et al., Journal of Vacuum Science and Technology: Part A, vol. 8, No. 1, (Jul./Aug. 1990).

*Primary Examiner*—Steven P. Griffin
*Assistant Examiner*—Eileen E. Nave

[57] ABSTRACT

A process for fabricating a feeler member for a micromechanical probe, in particular for an atomic force microscope, consists in creating a "positive" first mold by isotropically or anisotropically undercutting a silicon substrate. The resulting tip is precursor of the hard material (preferably diamond) tip to be obtained. The precursor has a small angle at the apex, for example in the order of 10° to 20°, or less. The positive mold is then used to fabricate a "negative" mold having an imprint whose shape is that of the tip precursor. The negative mold is filled with a layer of hard material and the tip is then uncovered. The hard material tip therefore also has a small angle at the apex, equal to that of the precursor. The resolution that can be achieved with the probe is therefore higher than that assured by prior art probes.

18 Claims, 2 Drawing Sheets

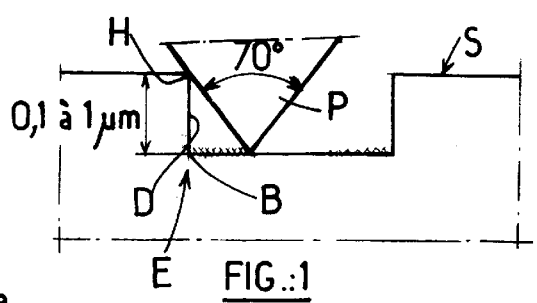
FIG.:1
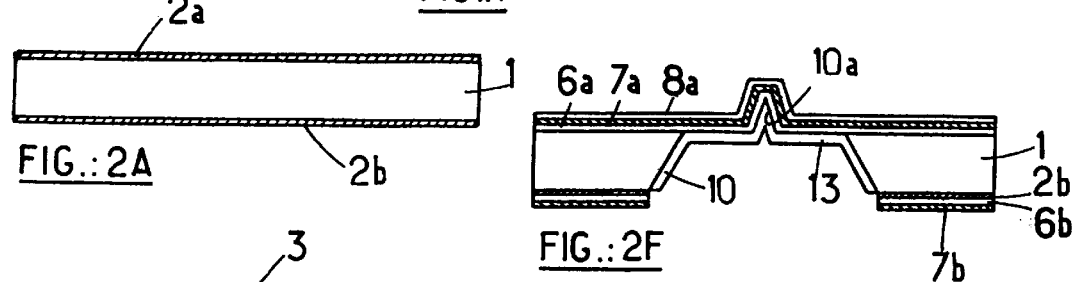
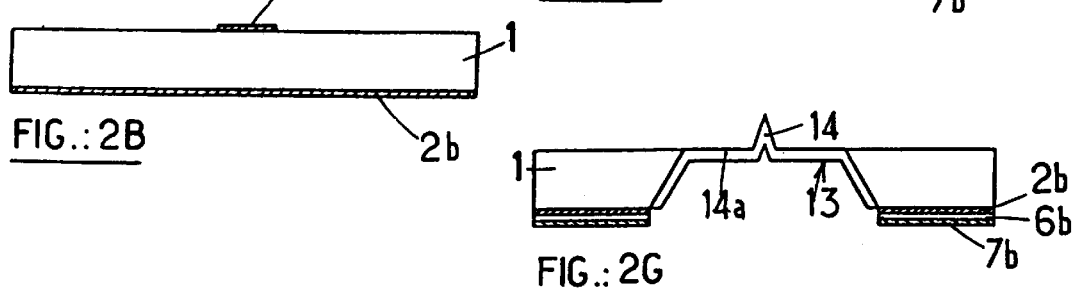

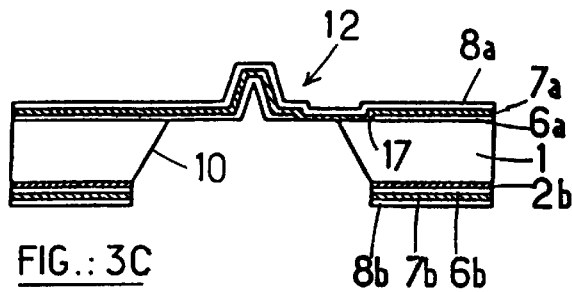
FIG.: 3C
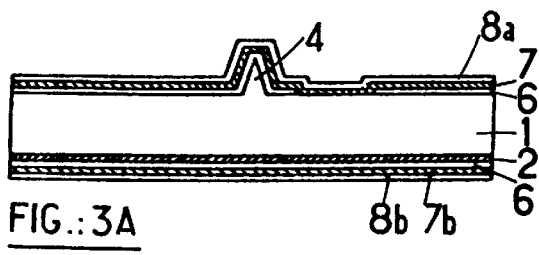
FIG.: 3A
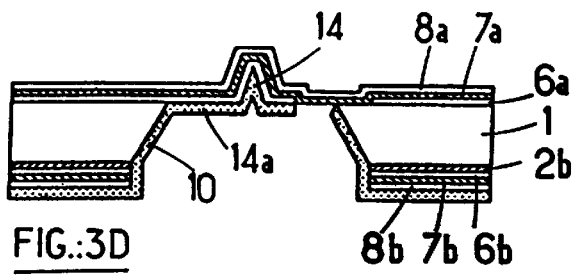
FIG.: 3D
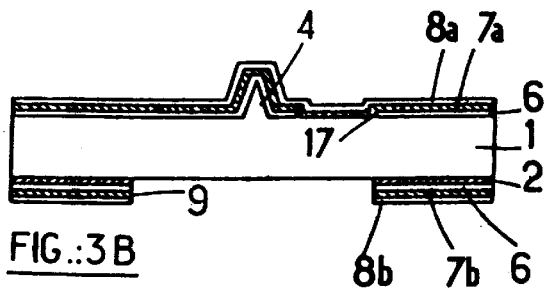
FIG.: 3B
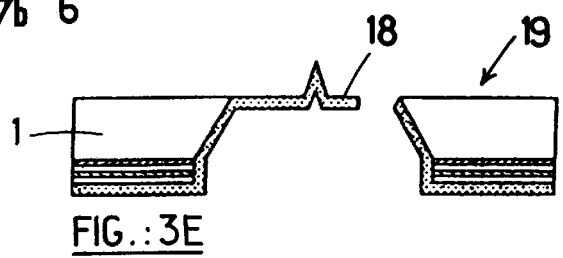
FIG.: 3E

PROCESS FOR FABRICATING A FEELER MEMBER FOR A MICROMECHANICAL PROBE, IN PARTICULAR FOR AN ATOMIC FORCE MICROSCOPE

BACKGROUND OF THE INVENTION

1. Field of the Invention

The present invention concerns a process of fabricating a feeler member used in a micromechanical probe, in particular for an atomic force microscope or the like, which member can have one or more feeler tips. The invention also concerns a feeler member fabricated by this process.

2. Description of the Prior Art

Probes of this type for atomic force microscopes (AFM) are used in profilometry techniques, in particular, the tip or tips being made with a precision significantly better than one micron and being movable over submicron distances in three orthogonal directions to scan the surface of a sample to measure its topography at the atomic dimension level.

A number of processes are currently employed for fabricating feeler members of the type indicated above. For example, a pyramid-shape hole can be micro-machined, for example KOH etched, in a silicon substrate for use as a mold and the hole obtained in this way filled with silicon nitride or diamond, after which the silicon is removed to leave a tip used to explore the surface of a sample. A process of the above kind can be used to fabricate feeler members including a plurality of tips disposed side-by-side, for example.

Another process consists in forming silicon tips on a surface on which the silicon has been "undercut" isotropically or anisotropically.

Feeler members can also be made with carbon tips by depositing carbon using an electron beam or with tips obtained by etching using a beam of focused ions. Other techniques can be used entailing photo-structured glass or molding silicon nitride in holes obtained by RIE (reactive ion etching).

Of all the above techniques, those for obtaining diamond tips are generally preferred because of the very high Young's modulus of this material (1000 GPa compared to that of silicon which is only 170 GPa), which makes the tip very rigid, and because of the very high hardness of diamond, highly resistant to wear.

The fabrication of diamond tips uses the molding technique employing, for example, the fabrication process described in patent EP 0 766 060 in which the diamond is grown onto a diamond nucleation layer previously deposited into a hole formed in a silicon substrate.

A preferred process of making such holes in the substrate is [111] anisotropic KOH etching, for example, and produces pyramid-shape holes, in principle with a square base with an angle of approximately 70° between projections of the pyramid axis onto two opposite faces.

Probes with tips molded in holes having angles this large have a relatively low resolution, so fairly sudden discontinuities of the surface to be explored cannot be measured with the required precision. This is illustrated in FIG. 1 of the appended drawings showing that if, for example, the discontinuity is a step E (which can have a depth of 0.1 µm to 1 µm, for example), the feeler tip P cannot get close to the base B of the wall D upstanding perpendicularly to the surface S to be explored. The height H of the wall D will come into contact with one of the oblique faces of the pyramid of the tip, moving the apex of the latter away from the wall D by an amount proportional to the value of the angle defined above.

Note that finer tips with a more or less conical shape and a half-angle at the apex between 10° and 20°, or less, have already been made by undercutting a silicon substrate, these tips also having a very small radius of curvature at their free end, typically in the range 5 nm to 20 nm.

However, as indicated hereinabove, these tips are not satisfactory because of their low hardness and premature wear. A description of a process of fabricating such tips is given in an article by T. Albrecht et al entitled "Microfabrication of cantilever styli for atomic force microscope" published in journal of Vacuum Science and Technology, Volume 8, page 3386, 1990.

An aim of the invention is to provide a process of fabricating a feeler member for a micromechanical probe having at least one tip of at least approximately conical shape and having a half-angle at the apex significantly smaller than that of tips made until now.

SUMMARY OF THE INVENTION

The invention consists in a process for fabricating a feeler member used in a micromechanical probe, in particular for an atomic force microscope or the like, the member having one or more feeler tips, the process including:

creating by selective photolithographic operations on a silicon substrate coated with at least one barrier layer a negative mold the wall of which has at least one imprint of the feeler tip to be obtained, coating at least a part of the wall of the negative mold, including the imprint, with a layer of hard material, removing the barrier layer, and forming a tip precursor on a first face of the substrate by undercutting the silicon of the substrate to form a positive mold, wherein the photolithographic operations consist in selectively etching a second face of the substrate opposite the first face so as to eliminate the silicon of the substrate as far as the barrier layer in the region containing the tip precursor, including the silicon constituting the tip precursor, to form the negative mold.

As a result of the above features the feeler tip obtained has an angle at the apex substantially equal to that of the tip precursor. As the latter is obtained by undercutting the silicon it has a small half-angle at the apex, in the order of 10° or 20° or less. Consequently, the resolution of a probe equipped with a feeler member of the above kind is higher than that of prior art probes. Note also that the radius of curvature of the free end of a tip of the above kind is very small, typically in the order of 5 nm to 20 nm.

Other features and advantages of the invention will become apparent from the following description given by way of example only and with reference to the appended drawings.

BRIEF DESCRIPTION OF THE DRAWINGS

FIG. 1, already described, is a schematic view of part of a sample whose surface is to be explored using a probe incorporating a feeler member, the surface featuring a sudden discontinuity.

FIGS. 2A through 2I are cross-sectional views of part of a substrate on which various fabrication operations are effected illustrating successive steps of a process constituting a first embodiment of the invention.

FIGS. 3A through 3E are view analogous to those of FIGS. 2A through 2I and showing various successive steps of a process constituting another embodiment of the invention.

DETAILED DESCRIPTION OF THE PREFERRED EMBODIMENTS

A first embodiment of the invention will be described first with reference to FIGS. 2A through 2I.

As shown in FIG. 2A, the process starts with a silicon wafer 1 a few hundred micrometers thick on which a large number of tips in accordance with the invention can be formed simultaneously, the figure illustrating the fabrication of only one such tip.

The wafer 1 is covered on each face with a respective layer 2a and 2b of oxide, the layer 2a being then structured, by depositing a photoresist and appropriate etching, to form an oxide masking area 3 (FIG. 2B).

The substrate 1 is then etched to eliminate silicon on the face carrying the oxide mask 3, which eliminates the silicon not only where it is not covered by the oxide but also under the latter, the remainder of the wafer being then profiled in a particular way. This is why this operation is known as "undercutting".

This undercutting can be carried out in two different ways. A first way is isotropic and consists in using a plasma, the RIE method employing $SF_6$, for example, or a mixture of HF, $HNO_3$ and $H_2O$. The second, preferred at this time, is anisotropic and uses KOH.

In either case the undercutting can be carried out in a number of phases each of which removes a layer of silicon of a given thickness. The total thickness of the layers corresponds to the length of the tip finally to be obtained.

FIG. 2C shows the result of undercutting. Note that the substrate 1 now has a silicon tip precursor 4 on one face, the other face being untouched because it is still covered with the oxide layer 2b. The silicon tip 4 is pyramid-shape with a more or less octagonal base with rounded corners so that its shape is similar to that of a cone. Note that it has a small half-angle at the apex, in the range approximately 10° to approximately 20°, or less, for example. The wafer at this stage of the process constitutes a "positive mold" 5.

The positive mold 5 obtained in this way is then subjected to a number of coating operations. Firstly, the positive mold 5 receives on both faces a layer 6a, 6b of silicon nitride $Si_3N_4$ with a thickness in the range 1000 angstroms to 10,000 angstroms, preferably 2000 angstroms. This operation can be carried out using chemical vapor deposition (CVD). The layers 6a and 6b are then covered with oxide layers 7a, 7b with a thickness of up to 2000 angstroms to 10,000 angstroms, preferably 5000 angstroms. The layers 7a and 7b can also be obtained by chemical vapor deposition.

This step of the process can be followed by further deposition of at least one layer 8a and 8b of silicon nitride $Si_3N_4$ on each of the respective two oxide layers 7a and 7b, the thicknesses being the same as those of the layers 6a and 6b, for example.

The resulting structure is coated on both faces with protective photoresist layers (not seen in the figures), the layer on the face opposite that with the tip 4 being exposed through a mask and developed, which uncovers in the layer 8b a substantially square region the center of which is in line with the tip 4.

RIE treatment of the layers 6b, 7b and 8b in this area exposes the silicon of the substrate, which creates an opening 9 (FIG. 2D).

The silicon below the opening 9 is then eliminated, as shown in FIG. 2E, by two phases of anisotropic KOH etching, the first phase eliminating the greater part of the silicon without reaching the nitride layer 6a. The nitride layer 8b is then removed, for example by RIE, and the KOH etching terminates with the second phase, which reaches the layer 6a on the side of the substrate carrying the tip 4.

The successive etching operations create a cavity 10 the bottom of which is formed by a membrane 11 consisting of superposed layers 6a, 7a and 8a of nitride and oxide. Note that the strength of the membrane 11 is in direct proportion to the number of superposed layers, strength being an advantage above all if the wafer 1 is to be handled and transferred.

The anisotropic KOH etching cannot remove completely and satisfactorily the silicon from the tip 4 itself. It is therefore preferred to carry out the KOH etching operations until the barrier 6a is almost reached, after which further isotropic etching removes this material from the tip 4. The isotropic etching is preferably carried out using a wet mixture of HF, $HNO_3$ and $H_2O$.

The structure shown in FIG. 2E therefore has a cavity 10 extended by a tipped hole 10a which is the negative shape of the tip 4, with a small half-angle at the apex in the range approximately 10° to approximately 20° or less, for example. This structure is referred to hereinafter as the "negative mold" 12.

The negative mold 12 is then used to "mold" the required hard material tip (FIG. 2F). The hard material used can be boron nitride, silicon carbide or a metal such as gold or platinum. However, for reasons already explained above, the preferred material for the tip is diamond. Note that in the present context the expression "hard" must be understood as a relative qualifier, defining a hardness which is high relative to the lower hardness of the surface to be explored by the feeler member including the tip.

This being so, if the hard material is diamond, it is preferable to deposit a nucleation layer (no reference number in the figure) in the manner described in the European patent application previously cited. This nucleation layer is not deposited on the oxide layer 7b because diamond cannot adhere structurally to the latter.

Diamond is then deposited on the nucleation layer, preferably by chemical vapor deposition, to obtain a diamond layer 13 having a thickness of 100 nm to 5 μm, a preferred thickness being 1 μm. The diamond can be deposited in the pure state or it can be doped, for example with boron to confer on it a predetermined conductivity that can be used subsequently for measurements employing an electrical current flowing in the tip. The doping can be effected using a gaseous mixture of $H_2$, $CH_4$ and boron. The diamond layer 13 obtained in this way spreads over all of the wall of the cavity 10 and of the hole 10a.

The other materials proposed for making the tip can be deposited by conventional deposition processes.

The next step of the fabrication process (FIG. 2G) is to remove the nitride and oxide layers 6a, 7a and 8a on the face of the substrate opposite the cavity 10, for example by RIE, which uncovers a hard material tip 14 supported by a membrane 14a of the same material attached to the lateral walls of the cavity 10. Obviously the hard material must resist this etching; this is why, if it is of metal, it is preferable to use gold or platinum, in which case the etching can be carried out using hot phosphoric acid.

The tip 14 and the membrane 14a can then be further exposed, if required, by etching the silicon of the face of the substrate on the same side as the tip 14, for example using KOH (FIG. 2H). This uncovering of the tip 14 enables more convenient positioning of the feeler member during subsequent measurements, if necessary.

FIG. 2I is a schematic representation of a feeler member in accordance with the invention obtained by the process as just described. The assembly shown in FIG. 1H is mounted on a profiled support 15 by means of a layer 16 of glue, the shape of the support 15 matching the shape of the wall of the cavity 10.

The process of the invention being executed on a silicon wafer, it is feasible to fabricate several thousand feeler members simultaneously, the wafer being sawn up in a suitable manner before the individual feeler members are mounted on a support 15.

By virtue of the process of the invention, which entails successive fabrication of a positive mold 5 and then of a negative mold 12 from the positive mold, the tip 14 has a half-angle at the apex equal to that of a silicon tip obtained in the conventional way by undercutting, which produces an angle at the apex that can be significantly less than 20°. The resolution of measurements obtained with a feeler member fabricated in this way can be significantly better than in the past, with the feeler member also being highly resistant to wear. Note that the feeler member can be used by applying to it a force which can be less than 1 mN.

FIGS. 3A through 3E represent a variant embodiment of the process of the invention producing feeler members cantilevered relative to the substrate 1. This can be advantageous for certain measurements, as explained in the European patent application referred to above. This embodiment differs from that described above in that after depositing the first nitride layer 6a this layer is selectively etched, using RIE, for example, and a conventional photoresist, to form an opening 17, after which the process is executed in the same fashion as previously, except that, at least in the situation represented, the nitride layer 8b on the same side as the cavity 10 is left, as shown from FIG. 3B onwards.

After the cavity 10 is formed (FIG. 3C), the opening 17 previously formed in the nitride layer 6b means that a part of the oxide layer 7a is bared in this cavity. As a result, during the consecutive step of depositing a layer of hard material the latter will be missing at this location. On the other hand, in the embodiment illustrated here, the hard material layer can be deposited on the layer 8b previously retained. As a result of this, the hard material is also formed on the face of the whole opposite the tip 14 exposed during the operation to remove the layers 6a, 7a and 8a. This interrupts the layer of hard material formed in the cavity 10. This produces a feeler member including a hard material lever 18, a part 19 of the whole no longer having any utility.

Diverse other variants of the process of the invention are feasible.

For example, the silicon nitride can be replaced with silicon carbide in the layers 6a, 6b and 8a, 8b.

There is claimed:

1. A process for fabricating a feeler member used in a micromechanical probe, in particular for an atomic force microscope or the like, said member having one or more feeler tips, said process including:

creating by selective photolithographic operations on a silicon substrate coated with at least one barrier layer a negative mold the wall of which has at least one imprint of the feeler tip to be obtained, coating at least a part of said wall of said negative mold, including said imprint, with a layer of hard material, removing said barrier layer, and forming a tip precursor on a first face of said substrate by undercutting the silicon of said substrate to form a positive mold, wherein said photolithographic operations consist in selectively etching a second face of said substrate opposite said first face so as to eliminate said silicon of said substrate as far as said barrier layer in the region containing said tip precursor, including said silicon constituting said tip precursor, to form said negative mold.

2. The process claimed in claim 1 wherein said hard material chosen from diamond, boron nitride, silicon carbide and a metal such as gold or platinum.

3. The process claimed in claim 1 wherein said barrier layer is a layer of a material chosen from silicon nitride and silicon carbide.

4. A process as claimed in claim 1 further including, prior to said photolithographic operations, coating said barrier layer with at least a first stack of additional layers comprising an oxide layer and a layer of the same material as said barrier layer.

5. The process claimed in claim 1 wherein said selective photolithographic operations comprise depositing on said second face simultaneously with depositing said barrier layer a cover layer of the same material as the latter and selectively opening said cover layer in the region corresponding to said tip precursor so that it can serve as a mask during elimination of said silicon as far as said barrier layer.

6. The process claimed in claim 5 wherein simultaneously with coating said barrier layer with a first stack of additional layers said cover layer is coated with at least a second stack of additional layers of the same materials as respective additional layers.

7. A process as claimed in claim 1 further including forming an opening in said barrier layer before said photolithographic operations to create a cantilever feeler tip.

8. The process claimed in claim 1 wherein said selective photolithographic operations consist in eliminating the silicon of said substrate by anisotropic etching substantially as far as said barrier layer followed by elimination of said tip precursor by isotropic etching.

9. The process claimed in claim 8 wherein said anisotropic etching uses KOH and said isotropic etching wet-chemical etching using a mixture containing HF, $HNO_3$ and $H_2O$.

10. The process claimed in claim 1 wherein said barrier layer has a thickness in the range of 1000 angstroms to 10,000 angstroms.

11. The process claimed in claim 4 wherein said first stack of additional layers comprises an oxide layer with a thickness in the range of 1000 angstroms to 10000 angstroms, and said other additional layer has a thickness in the range of 1000 angstroms to 10000 angstroms.

12. The process claimed in claim 2 wherein said hard material is diamond and a diamond nucleation layer is formed in the cavity of said negative mold before said diamond layer is deposited.

13. The process claimed in claim 1 wherein said hard material layer is formed to a thickness in the range of 100 nm to 5 μm.

14. The process claimed in claim 2 wherein said hard material is diamond and said diamond layer is doped to render it conductive.

15. A feeler member made by the process as claimed in claim 1 including at least one tip of at least approximately conical shape having a half-angle at the apex in the range 10° to 20° or less.

16. The process of claim 10 wherein said barrier layer has thickness of 2000 angstroms.

17. The process of claim 11 wherein said oxide layer has thickness of 5000 angstroms and said other additional layer has a thickness of 2000 angstroms.

18. The process of claim 13 wherein said hard material layer has a thickness of 1 μm.

* * * * *